United States Patent
Huang et al.

(10) Patent No.: US 12,400,121 B2
(45) Date of Patent: Aug. 26, 2025

(54) REGULARIZED NEURAL NETWORK ARCHITECTURE SEARCH

(71) Applicant: Google LLC, Mountain View, CA (US)

(72) Inventors: Yanping Huang, Mountain View, CA (US); Alok Aggarwal, Foster City, CA (US); Quoc V. Le, Sunnyvale, CA (US); Esteban Alberto Real, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 12 days.

(21) Appl. No.: 18/140,442

(22) Filed: Apr. 27, 2023

(65) Prior Publication Data

US 2023/0259784 A1    Aug. 17, 2023

Related U.S. Application Data

(63) Continuation of application No. 17/475,137, filed on Sep. 14, 2021, now Pat. No. 11,669,744, which is a
(Continued)

(51) Int. Cl.
*G06N 3/086* (2023.01)
*G06N 3/04* (2023.01)

(52) U.S. Cl.
CPC .............. *G06N 3/086* (2013.01); *G06N 3/04* (2013.01)

(58) Field of Classification Search
CPC .......... G06N 3/086; G06N 3/04; G06N 3/045; G06N 3/082
See application file for complete search history.

(56) References Cited

U.S. PATENT DOCUMENTS

2007/0094180 A1    4/2007    Rifkin et al.

FOREIGN PATENT DOCUMENTS

| CN | 105637540 A | 6/2016 |
| CN | 105938559 A | 9/2016 |
| WO | WO 2010035690 A2 | 4/2010 |

OTHER PUBLICATIONS

Zoph et al, "Learning Transferable Architectures for Scalable Image Recognition" IEEE Conference on Computer Vision and Pattern Recognition Oct. 2017, 13 pages (Year: 2017).*
(Continued)

*Primary Examiner* — Shahid K Khan
*Assistant Examiner* — Su-Ting Chuang
(74) *Attorney, Agent, or Firm* — Fish & Richardson P.C.

(57) ABSTRACT

A method for receiving training data for training a neural network (NN) to perform a machine learning (ML) task and for determining, using the training data, an optimized NN architecture for performing the ML task is described. Determining the optimized NN architecture includes: maintaining population data comprising, for each candidate architecture in a population of candidate architectures, (i) data defining the candidate architecture, and (ii) data specifying how recently a neural network having the candidate architecture has been trained while determining the optimized neural network architecture; and repeatedly performing multiple operations using each of a plurality of worker computing units to generate a new candidate architecture based on a selected candidate architecture having the best measure of fitness, adding the new candidate architecture to the population, and removing from the population the candidate architecture that was trained least recently.

22 Claims, 5 Drawing Sheets

Related U.S. Application Data continuation of application No. 16/906,034, filed on Jun. 19, 2020, now Pat. No. 11,144,831, which is a continuation of application No. PCT/US2019/016515, filed on Feb. 4, 2019.

(60) Provisional application No. 62/625,923, filed on Feb. 2, 2018.

(56) References Cited

OTHER PUBLICATIONS

Zhang et al, "Evolutionary Computation and Its Applications in Neural and Fuzzy Systems" Applied Computational Intelligence and Soft Computing, Jan. 2011, 21 pages (Year: 2011).*
Abadi et al, "Tensorflow: Large-Scale machine learning on heterogeneous distributed systems" arXiv, 2016, 19 pages.
Baker et al, "Accelerating neural architecture search using performance prediction" arXiv, 2017, 14 pages.
Baker et al, "Designing neural network architectures using reinforcement learning" arXiv, 2016, 18 pages.
Bello et al, "Neural optimizer search with reinforcement learning" arXiv, 2017, 12 pages.
Bergstra et al, "Random search for hyper-parameter optimization" Journal of Machine Learning Research, 2012, 25 pages.
Brock et al, "Smash: one-shot model architecture search through hypernetworks" arXiv, 2017, 21 pages.
Cai et al, Reinforcement learning for architecture search by network transformation arXiv, 2017, 8 pages.
Castillo et al, "G-Prop: Global optimization of multilayer perceptrons using GAs" Neurocomputing, 2000, 15 pages.
Chen et al, "Dual path networks" Advances in Neural Information Processing Systems, 2017, 9 pages.
Chollet et al, "Xception: Deep learning with depthwise separable convolutions" arXiv, 2016, 14 pages.
Ciresan et al, "Multi-column deep neural networks for image classification" Computer vision and pattern recognition, 2012, 8 pages.
Cortes et al, "Adanet: Adaptive structural learning of artifical neural networks" arXiv, 2016, 20 pages.
Deng et al, "Imagenet: A large-scale hierarchical image database" Computer Vision and Pattern Recognition, 2009, 8 pages.
De Vries et al, "Improved regularization of convolutional neural networks with cutout" arXiv, 2017, 8 pages.
Elsken et al, "Simple and efficient architecture search for convolutional neural network" arXiv, 2017, 14 pages.
EP Office Action in European Application No. 19719658.7, dated Aug. 6, 2021, 11 pages.
Fahlman et al, "The cascade-correlation learning architecture" Advance in neural information processing systems, 1990, 14 pages.
Fernando et al, "Pathnet: Evolution channels gradient descent in neural networks" arXiv, 2017, 16 pages.
Feurer et al, "Efficient and robust automated machine learning" Advances in Neural Information Processing Systems, 2015, 9 pages.
Floreano et al, "Neuroevolution: from architectures to learning" Evolutionary Intelligence, 2008, 16 pages.
Gastaldi, "Shake-shake regularization" arXiv, 2017, 10 pages.
Goldberg et al, "A comparative analysis of selection schemes used in genetic algorithms" Foundations of genetic algorithms, 1991, 25 pages.
Han et al, "Deep pyramidal residual networks" arXiv, 2016, 9 pages.
He et al, "Deep residual learning for image recognition" Proceedings of the IEEE Conference on Computer Vision and Pattern Recognition, 2016, 9 pages.
Howard et al, "Mobilenets: Efficient convolutional neural networks for mobile vision applications" arXiv, 2017, 9 pages.
Hu et al, "Squeeze-and-excitation networks" arXiv, 2017, 11 pages.
Huang et al, "Densely connected convolutional networks" arXiv, 2016, 9 pages.
Huang et al, "Learning deep resnet blocks sequentially using boosting theory" arXiv, 2017, 19 pages.
Jaderberg et al, "Population based training of neural networks" arXiv, 2017, 21 pages.
Jouppi et al, "In-datacenter performance analysis of a tensor processing unit" Proceedings of 44th Annual International Symposium on Computer Architecture, 2017, 12 pages.
Kim et al, "Deep clustered convolutional kernels" arXiv, 2015, 9 pages.
Krizhevsky et al, "Learning multiple layers of features from tiny images" 2009, 60 pages.
LeCun et al, "The mnist database of handwritten digits: AT&T Labs" 2010, 8 pages.
Liu et al, "Hierarchical representations for efficient architecture search" arXiv, 2017, 13 pages.
Liu et al, "Progressive neural architecture search" arXiv, 2017, 11 pages.
Mendoza et al, "Towards automatically-tuned neural networks" JMLR Workshop on Automatic Machine Learning 2016, 8 pages.
Miikkulainen et al, "Evolving deep neural networks" arXiv, 2017, 8 pages.
Miller et al, "Designing neural networks using genetic algorithms" Proceedings of the third international conference on Genetic algorithms, 1989, 6 pages.
Negrinho et al, "Deeparchitect: Automatically designing and training deep architectures" arXiv, 2017, 12 pages.
Office Action in Chinese Appln. No. 201980008348.6, dated Jan. 18, 2023, 31 pages (with English Translation).
PCT International Preliminary Report on Patentability in International Application No. PCT/US2019/016515, dated Aug. 4, 2020, 9 pages.
PCT International Search Report and Written Opinion in International Application No. PCT/US2019/016515, dated Jul. 10, 2019, 15 pages.
Pham et al, "Faster discovery of neural architectures by searching for paths in a large model" International Conference on Learning Representations, 2018, 14 pages.
Ramachandran et al, "Swish: a self-gated activation function" arXiv, 2017, 12 pages.
Real et al, "Large-scale evolution of image classifiers" arXiv, 2017, 18 pages.
Sandler et al, "Inverted residuals and linear bottlenecks: Mobile networks for classification, detection and segmentation" arXiv, 2018, 14 pages.
Saxena et al, "Convolutional neural fabrics" Advances in Neural Information Processing Systems, 2016, 9 pages.
Simmons et al, "False-positive psychology: Undisclosed flexibility in data collection and analysis allows presenting anything as significant" Psychological Science, 2011, 8 pages.
Srivastava et al, "Dropout: A Simple way to prevent neural networks from overfitting" The Journal of Machine Learning Research, 2014, 30 pages.
Stanley et al, "Evolving neural networks through augmenting topologies" Evolutionary Computation, 2002, 29 pages.
Stanley, "Compositional pattern producing networks: A novel abstraction of development" Genetic programming and evolvable machines, 2007, 36 pages.
Such et al, "Deep neuroevolution: Genetic algorithms are a competitive alternative for training deep neural networks for reinforcement learning" arXiv, 2017, 15 pages.
Suganuma et al, "A Genetic programming approach to designing convolutional neural network architectures" arXiv, 2017, 9 pages.
Szegedy et al, "Going deeper with convolutions" Proceedings of the IEEE Conference on Computer Vision and Pattern Recognition, 2015, 9 pages.
Szegedy et al, "Inception-v4, inception-resnet and the impact of residual connections on learning " AAAI, 2017, 7 pages.
Szegedy et al, "Rethinking the inception architecture for computer vision" Proceedings of the IEEE Conference on Computer Vision and Pattern Recognition, 2016, 9 pages.
Wan et al, "Regularization of neural networks using dropconnect" International Conference on Machine Learning, 2013, 9 pages.

(56) References Cited

OTHER PUBLICATIONS

Xie et al, "Aggregated residual transformations for deep neural networks" Computer Vision and Pattern Recognition, 2017, 10 pages.
Xie et al, "Genetic cnn" arXiv, 2017, 10 pages.
Xie et al, "Research on an automatic retrieval method for special topic news based on semantic frame," Journal of University of Science and Technology of China, Mar. 15, 2016, 46(3):253-258 (with English Abstract).
Yamada et al, "Shakedrop regularization" ICLR, 2018, 12 pages.
Zagoruyko et al, "Wide residual networks" arXiv, 2016, 15 pages.
Zhang et al, "Evolutionary Computation and Its Applications in Neural and Fuzzy Systems" Applied Computational Intelligence and Soft Computing, Jan. 2011, 21 pages.
Zhang et al, "Polynet: A pursuit of structural diversity in very deep networks" IEEE Conference on Computer Vision and Pattern Recognition, 2017, 9 pages.
Zhang et al, "Shufflenet: An extremely efficient convolutional neural network for mobile devices" arXiv, 2017, 9 pages.
Zhang et al, "Evolutionary Computation and Its Applications in Neural and Fuzzy Systems," Applied Computational Intelligence and Soft Computing, Jan. 2011, 20 pages.
Zhong et al, "Practical network blocks design with q-learning" arXiv, 2017, 11 pages.
Zoph et al, "Learning Transferable Architectures for Scalable Image Recognition" IEEE Conference on Computer Vision and Pattern Recognition Oct. 2017, 13 pages.
Zoph et al, "Neural architecture search with reinforcement learning" arXiv, 2016, 15 pages.

\* cited by examiner

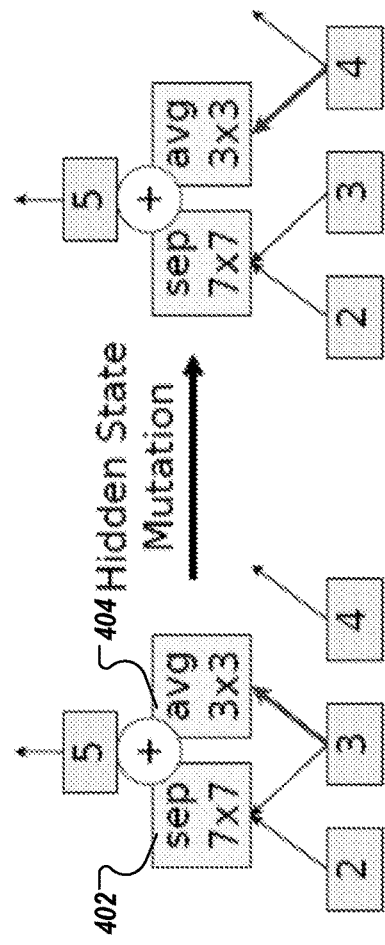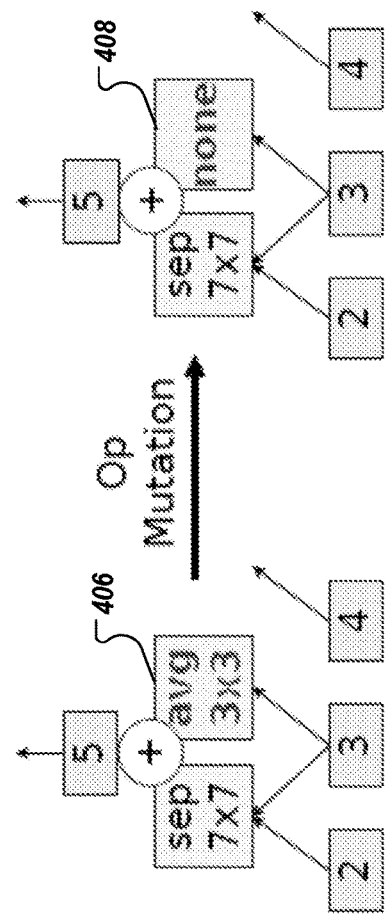
FIG. 4A
FIG. 4B

REGULARIZED NEURAL NETWORK ARCHITECTURE SEARCH

CROSS-REFERENCE TO RELATED APPLICATION

This application is a continuation of U.S. application Ser. No. 17/475,137 filed Sep. 14, 2021, which is a continuation of U.S. application Ser. No. 16/906,034 filed Jun. 19, 2020, (U.S. Pat. No. 11,144,831) which is a continuation of International Application No. PCT/US2019/016515, filed Feb. 4, 2019, which claims priority to U.S. Provisional Application Ser. No. 62/625,923, filed on Feb. 2, 2018. The disclosure of the prior applications are considered part of and are incorporated by reference in the disclosure of this application.

BACKGROUND

This specification relates to determining architectures for neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

In general, one innovative aspect of the subject matter described in this specification can be embodied in methods for determining an optimized neural network architecture for a neural network configured to perform a machine learning task. The method comprises receiving training data for training a neural network to perform a machine learning task, the training data comprising a plurality of training examples and a respective target output for each of the training examples; and determining, using the training data, an optimized neural network architecture for performing the machine learning task, comprising: maintaining population data comprising, for each candidate architecture in a population of candidate architectures, (i) data defining the candidate architecture, and (ii) data specifying how recently a neural network having the candidate architecture has been trained while determining the optimized neural network architecture, and repeatedly performing the following operations using each of a plurality of worker computing units each operating asynchronously from each other worker computing unit: selecting, by the worker computing unit, a plurality of candidate architectures from the population, training, for each selected candidate architecture and by the worker computing unit, a new neural network having the candidate architecture on a training subset of the training data to determine trained values of parameters of the new neural network; determining, for each selected candidate architecture and by the worker computing unit, a measure of fitness by evaluating a performance of the trained new neural network on a validation subset of the training data, generating, by the worker computing unit, a new candidate architecture based on the selected candidate architecture having the best measure of fitness, adding the new candidate architecture to the population, and removing from the population the candidate architecture that was trained least recently.

The method may further comprise providing data specifying the optimized architecture. The method may further comprise determining trained values of parameters of a neural network having the optimized neural network architecture. The method may further comprise providing the data specifying the trained parameters. The operations may further comprise training the new candidate architecture to determine trained values of parameters; and associating the trained values of the parameters with the new candidate architecture in the population data. Determining trained values of parameters of a neural network having the optimized neural network architecture may comprise selecting, as the trained values of the parameters of the neural network having the optimized neural network architecture, trained values that are associated with the architecture that is associated with the best measure of fitness. Determining trained values of parameters of a neural network having the optimized neural network architecture may comprise further training the neural network having the optimized neural network architecture on more training data to determine the trained values. Training, for each selected candidate architecture and by the worker computing unit, a new neural network having the candidate architecture on a training subset of the training data to determine trained values of parameters of the new neural network may comprise training the new neural network starting from the values that are associated with the candidate architecture in the population data. The method may further comprise initializing the population with a plurality of default candidate architectures. For each candidate architecture, the data defining the candidate architecture may identify an architecture for one or more cells that are each repeated multiple times to generate the candidate architecture. Generating, by the worker computing unit, a new candidate architecture based on the selected candidate architecture having the best measure of fitness may comprise modifying the architecture for at least one of the cells in the candidate architecture having the best measure of fitness. Modifying the architecture for a cell may comprise randomly selecting a mutation from a set of mutations; and applying the randomly selected mutation to the architecture for the cell. Modifying the architecture for a cell may comprise processing data specifying the candidate architecture having the best measure of fitness using a mutation neural network, wherein the mutation neural network has been trained to process a network input comprising the data to generate the new candidate architecture. Determining, using the training data, an optimized neural network architecture for performing the machine learning task may comprise selecting the candidate architecture in the population having the best fitness as the optimized architecture. The machine learning task may be one or more of the following: image processing, image classification, speech recognition and natural language processing.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. By determining the architecture of a neural network using the aging evolution techniques described in this specification, a system can determine a network architecture that achieves or even exceeds state of the art performance on any of a variety of machine learning tasks, e.g., image classification or another image processing task. In particular, the techniques use each of multiple worker computing units to generate a new architecture by mutating a corresponding candidate architecture having the best measure of fitness at each iteration, to add the new architecture to a population of candidate architectures, and to remove an old architecture that was trained least recently from the population. By removing the least recently trained architecture (or the oldest architecture) at each iteration, the system allows all candidate architectures in the population to have a short lifespan. Therefore, the population is wholly renewed frequently, leading to more diversity and more exploration, which results in better architecture search results while retaining the system's efficiency thanks to the simplicity of aging evolution. Further, because only the best candidate architectures are selected to be mutated, the described techniques allow the population of candidate architecture to significantly improve over time. Thus, the resultant optimized architecture for the neural network has better performance (e.g., better accuracy) when performing the particular machine learning task compared to those generated by existing neural network architecture search methods. The techniques can determine this optimized architecture while requiring minimal hyper-parameters and minimal to no user input. Additionally, the system can determine this architecture in a manner that leverages distributed processing, i.e., by distributing the training operations among the multiple worker computing units that operate asynchronously, to determine the optimized architecture more rapidly. The operations for determining an optimized architecture have been adapted such that the operations may be carried out asynchronously and in parallel by distributed worker computing units to determine the optimized architecture more efficiently.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A and 4B illustrate examples of a mutation.

Like reference numbers and designations in the various drawings indicate like elements.

DETAILED DESCRIPTION

This specification describes a neural network architecture optimization system implemented as computer programs on one or more computers in one or more locations that determines an optimal network architecture for a neural network configured to perform a particular machine learning task. Depending on the task, the neural network can be configured to receive any kind of digital data input and to generate any kind of score, classification, or regression output based on the input.

For example, if the inputs to the neural network are images or features that have been extracted from images, the output generated by the neural network for a given image may be scores for each of a set of object categories, with each score representing an estimated likelihood that the image contains an image of an object belonging to the category.

As another example, if the inputs to the neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

Figure 1:
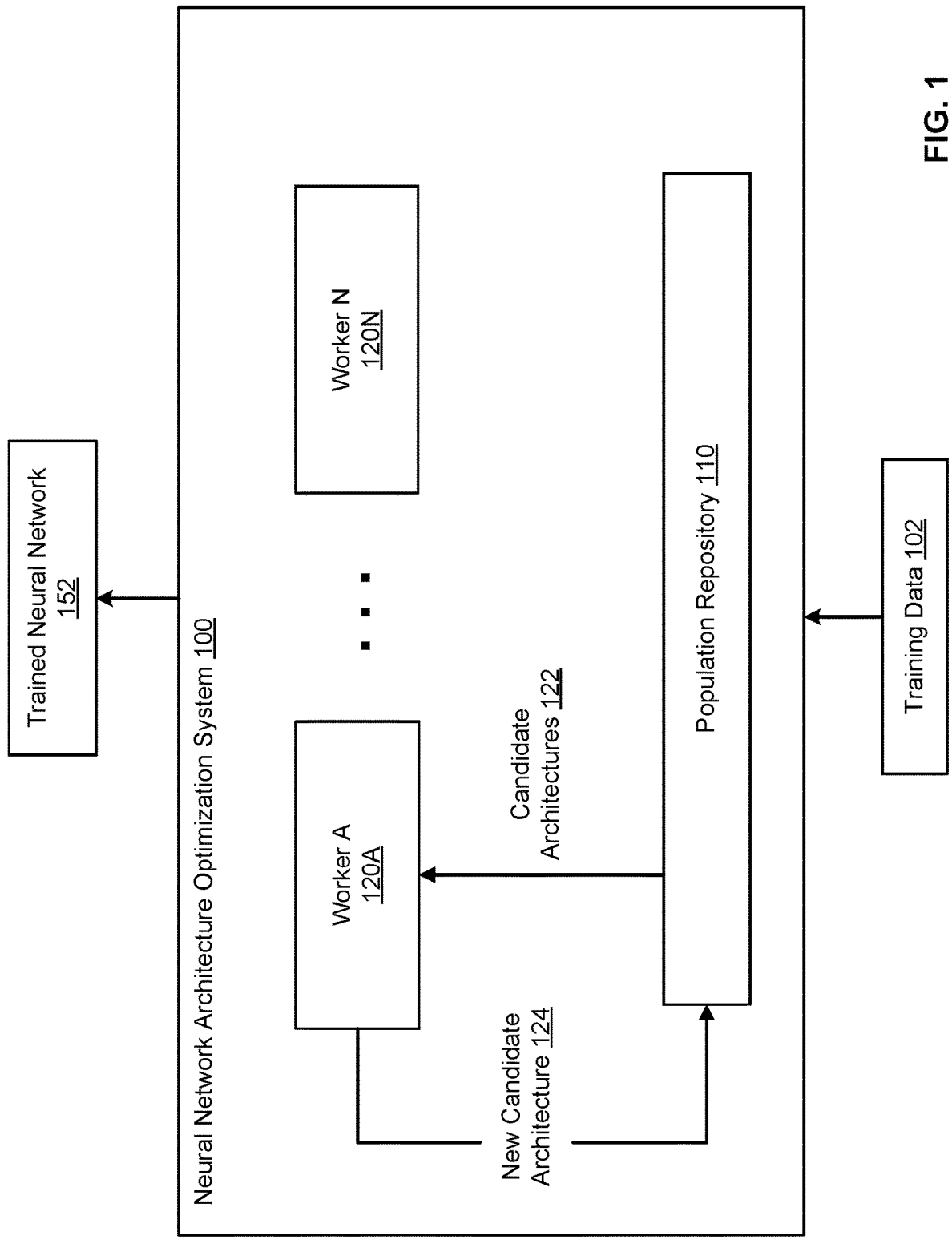
FIG. 1 shows an architecture of an example neural network architecture optimization system.

FIG. 1 shows an example neural network architecture optimization system 100. The neural network architecture optimization system 100 is an example of a system implemented as computer programs on one or more computers in one or more locations, in which the systems, components, and techniques described below can be implemented.

The neural network architecture optimization system 100 is a system that receives, i.e., from a user of the system, training data 102 for training a neural network to perform a machine learning task and uses the training data 102 to determine an optimal neural network architecture for performing the machine learning task and to train a neural network having the optimal neural network architecture to determine trained values of parameters of the neural network.

The training data 102 generally includes multiple training examples and a respective target output for each training example. The target output for a given training example is the output that should be generated by the trained neural network by processing the given training example. The system 100 divides the received training data into a training subset, a validation subset, and, optionally, a test subset.

The system 100 can receive the training data 102 in any of a variety of ways. For example, the system 100 can receive training data as an upload from a remote user of the system over a data communication network, e.g., using an application programming interface (API) made available by the system 100. As another example, the system 100 can receive an input from a user specifying which data that is already maintained by the system 100 should be used as the training data 102.

The neural network architecture optimization system 100 generates data 152 specifying a trained neural network using the training data 102. The data 152 specifies an optimal architecture of a trained neural network and trained values of the parameters of a trained neural network having the optimal architecture.

Once the neural network architecture optimization system 100 has generated the data 152, the neural network architecture optimization system 100 can instantiate a trained neural network using the trained neural network data 152 and use the trained neural network to process new received inputs to perform the machine learning task, e.g., through the API provided by the system. That is, the system 100 can receive inputs to be processed, use the trained neural network to process the inputs, and provide the outputs generated by the trained neural network or data derived from the generated outputs in response to the received inputs. Instead or in addition, the system 100 can store the trained neural network data 152 for later use in instantiating a trained neural network, or can transmit the trained neural network data 152 to another system for use in instantiating a trained neural network, or output the data 152 to the user that submitted the training data.

The machine learning task is a task that is specified by the user that submits the training data 102 to the system 100.

In some implementations, the user explicitly defines the task by submitting data identifying the task to the neural network architecture optimization system 100 with the training data 102. For example, the system 100 may present a user interface on a user device of the user that allows the user to select the task from a list of tasks supported by the system 100. That is, the neural network architecture optimization system 100 can maintain a list of machine learning tasks, e.g., image processing tasks like image classification, speech recognition tasks, natural language processing tasks like sentiment analysis, and so on. The system 100 can allow the user to select one of the maintained tasks as the task for which the training data is to be used by selecting one of the tasks in the user interface.

In some other implementations, the training data 102 submitted by the user specifies the machine learning task. That is, the neural network architecture optimization system 100 defines the task as a task to process inputs having the same format and structure as the training examples in the training data 102 in order to generate outputs having the same format and structure as the target outputs for the training examples. For example, if the training examples are images having a certain resolution and the target outputs are one-thousand dimensional vectors, the system 100 can identify the task as a task to map an image having the certain resolution to a one-thousand dimensional vector. For example, the one-thousand dimensional target output vectors may have a single element with a non-zero value. The position of the non-zero value indicates which of 1000 classes the training example image belongs to. In this example, the system 100 may identify that the task is to map an image to a one-thousand dimensional probability vector. Each element represents the probability that the image belongs to the respective class. The CIFAR-1000 dataset, which consists of 50000 training examples paired with a target output classification selected from 1000 possible classes, is an example of such training data 102. CIFAR-10 is a related dataset where the classification is one of ten possible classes. Another example of suitable training data 102 is the MNIST dataset where the training examples are images of handwritten digits and the target output is the digit which these represent. The target output may be represented as a ten dimensional vector having a single non-zero value, with the position of the non-zero value indicating the respective digit.

The neural network architecture optimization system 100 includes a population repository 110 and multiple worker computing units (also referred to as "workers") 120A-N that operate independently of one another to update the data stored in the population repository 110.

At any given time during the training, the population repository 110 is implemented as one or more storage devices in one or more physical locations and stores data specifying the current population of candidate neural network architectures. The system 100 can initialize the population repository with one or more default neural network architectures.

The population repository 110 stores population data including, for each candidate architecture in the population of candidate architectures, (i) data defining the candidate architecture, and (ii) data specifying how recently a neural network having the candidate architecture has been trained. Optionally, the population repository 110 can also store, for each candidate architecture, an instance of a neural network having the architecture, current values of parameters for the neural network having the architecture, or additional metadata characterizing the architecture.

Each of the candidate architectures in the population includes a stack of multiple cells. In some cases, in addition to the stack of cells, a candidate architecture includes one or more other neural network layers, e.g., an output layer and/or one or more other types of layers. For example, a candidate architecture may include a stack of cells followed by a softmax classification neural network layer. An example of a candidate architecture in the population is described in more detail below with reference to FIG. 2.

Generally, a cell is a fully convolutional neural network that is configured to receive a cell input and to generate a cell output for the cell input. In some implementations, each cell in a stack of cells of a candidate architecture may receive a direct input from the previous cell and a skip input from the cell before the previous cell.

A cell includes multiple operation blocks, for example three, five, or ten operation blocks. Each operation block in the cell receives one or more respective input hidden states, and uses a corresponding pairwise combination to construct a respective output hidden state from the input hidden states. In particular, a pairwise combination applies a first operation to an first input hidden state, applies a second operation to a second hidden state, and combines the outputs of the first and second operations to generate an output hidden state.

A given candidate architecture in the population of candidate architectures is specified by a plurality of pairwise combinations that form a cell that is repeated through the candidate architecture. In some implementations where each candidate architecture in the population includes a stack of cells of different types, a given candidate architecture can be specified by respective pairwise combinations for each type of cells.

For example, a given candidate architecture can include a stack of cells of two different type: normal cells and reduction cells. The candidate architecture can be specified by five pairwise combinations that make up the normal cell and five pairwise combinations that make up the reduction cell.

An example architecture of a cell and pairwise combinations are described in more detail below with reference to FIG. 3.

Each of the workers 120A-120N is implemented as one or more computer programs and data deployed to be executed on a respective computing unit. The computing units are configured so that they can operate independently of each other. In some implementations, only partial independence of operation is achieved, for example, because workers share some resources. A computing unit may be, e.g., a computer, a core within a computer having multiple cores, or other hardware or software within a computer capable of independently performing the computation for a worker.

Each of the workers 120A-120N iteratively updates the population of possible neural network architectures in the population repository 102 to improve the fitness of the population. Each worker operates independently and asynchronously from each other worker.

In particular, at each iteration, a given worker 120A-120N (for example, worker 120A) selects a plurality of candidate architectures (e.g., candidate architecture 122) from the population.

The given worker then trains, for each selected candidate architecture, a new neural network having the candidate architecture on a training subset of the training data 102 to determine trained values of parameters of the new neural network. The worker can train the new neural network starting from the parameter values that are associated with the candidate architecture in the population data.

The worker determines, for each selected candidate architecture, a measure of fitness by evaluating a performance of the trained new neural network on a validation subset of the training data. The measure of fitness can be any measure that is appropriate for the machine learning task and that measures the performance of the neural network on the machine learning task. For example, measures of fitness can include various classification errors, intersection-over-union measures, reward or return metrics, and so on.

The worker generates a new candidate architecture (e.g., new candidate architecture 124) based on the selected candidate architecture having the best measure of fitness. In particular, the worker modifies the architecture for at least one of the cells in the candidate architecture having the best measure of fitness.

In some implementations, the worker mutates the selected candidate architecture by processing data specifying the selected candidate architecture through a mutation neural network. The mutation neural network is a neural network that has been trained to receive an input that includes data specifying an architecture and to generate an output that defines another architecture that is different than the input architecture.

In some other implementations, the worker maintains data identifying a set of possible mutations that can be applied to an input architecture. For instance, the worker can randomly select a mutation from a set of mutations, and apply the randomly selected mutation to the selected candidate architecture.

The set of possible mutations can include any of a variety of architecture modifications that represent the addition, removal, or modification of a component from an architecture or a change in a hyper-parameter for the training of the neural network having the architecture. Examples of a mutation are described in detail below with reference to FIG. 4.

After generating the new candidate architecture from the selected candidate architecture having the best measure of fitness, the worker then adds the new candidate architecture to the population, and removes from the population the candidate architecture that was trained least recently. By removing the least recently trained architecture (or the oldest architecture) at each iteration, the system 100 allows all candidate architectures in the population to have a short lifespan. Therefore, the population is wholly renewed frequently, leading to more diversity and more exploration, which results in better architecture search results while retaining the system's efficiency. The process for selecting candidate architectures from the population, adding a new candidate architecture that is generated based on the selected candidate architecture having the best measure of fitness, and removing the oldest candidate architecture from the population may be referred to as "aging evolution" or "regularized evolution." The aging evolution is simple because it has few meta-parameters, most of which do not need tuning, thereby reducing computational costs associated with searching (as compared to other techniques that requires training an agent/controller which is often itself a neural network with many weights and their optimization has more meta-parameters to adjust: learning rate schedule, greediness, batching, replay buffer, etc.) Further, as only the candidate architecture having the best measure of fitness at each iteration is selected to be mutated, the regularized evolution process allows the population of candidate architecture to improve over time, resulting in an optimized neural network having better performance (e.g., better accuracy) when performing the particular machine learning task compared to existing neural network architecture search methods.

Once termination criteria for the training have been satisfied (e.g., after more than a threshold number of iterations have been performed or after the best fit candidate neural network in the population repository has a fitness that exceeds a threshold), the neural network architecture optimization system 100 selects an optimal neural network architecture from the architectures remaining in the population or, in some cases, from all of the architectures that were in the population at any point during the training.

In particular, in some implementations, the neural network architecture optimization system 100 selects the architecture in the population that has the best measure of fitness. In other implementations, the neural network architecture optimization system 100 tracks measures of fitness for architectures even after those architectures are removed from the population and selects the architecture that has the best measure of fitness using the tracked measures of fitness.

To generate the data 152 specifying the trained neural network, in some implementations, the neural network architecture optimization system 100 obtains the trained values for the parameters of a trained neural network having the optimal neural network architecture from the population repository 110. In some other implementations, the system 100 trains a neural network having the optimized architecture, e.g., either from scratch or to fine-tune the parameter values generated as a result of determining the optimized architecture for the neural network. The system can further train the neural network having the optimized neural network architecture on more training data to determine the final trained values of the trained neural network.

The system 100 then uses the trained neural network to process requests received by users, e.g., through the API provided by the system. In other implementations, the system can provide the data specifying the optimized architecture and, optionally, the trained parameter values, in response to receiving the training data 102, e.g., to a user over a data communication network.

In implementations where the system 100 generates a test subset from the training data, the system also tests the performance of a trained neural network having the optimized neural network architecture on the test subset to determine a measure of fitness of the trained neural network on the user-specified machine learning task. The system 100 can then provide the measure of fitness for presentation to the user that submitted the training data or store the measure of fitness in association with the trained values of the parameters of the trained neural network.

Figure 2B:
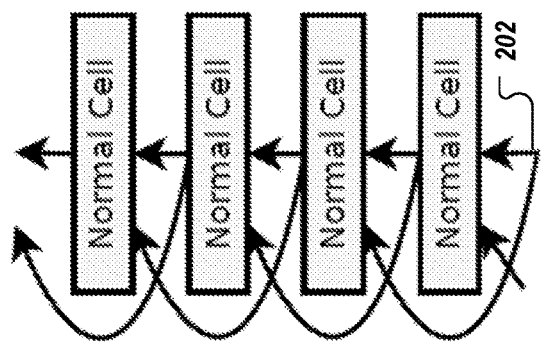
FIGS. 2A and 2B illustrate an example candidate architecture of a neural network for performing a machine learning task.
Figure 2A:
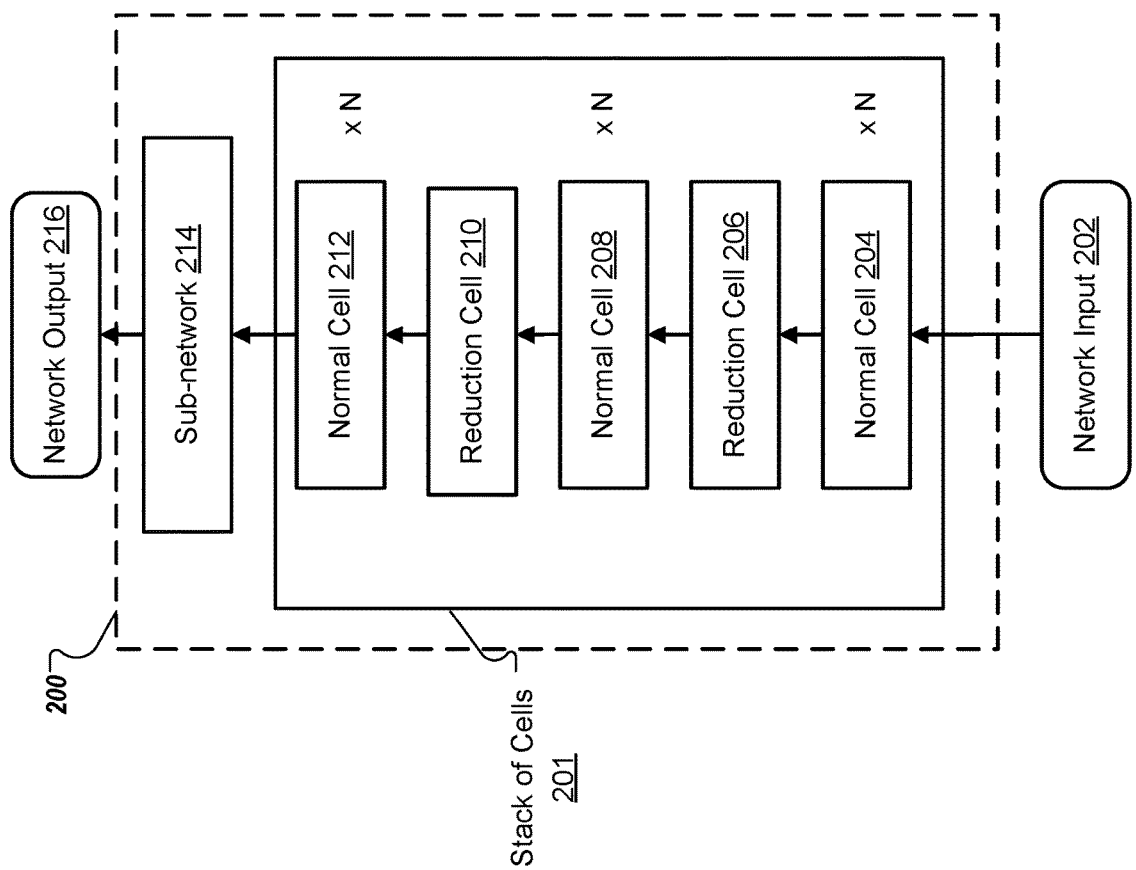

FIGS. 2A and 2B illustrates an example architecture of a neural network 200 for performing a machine learning task.

The neural network 200 includes a stack of cells 201. The stack 201 includes multiple cells that are stacked one after the other.

In some implementations, the cells in the stack 201 are of the same cell types, i.e., all of the cells have the same architecture but may have different parameter values. In some implementations, the cells in the stack 201 are of different cell types. For example, as shown in FIG. 2A, stack 201 includes cells of two types: normal cells and reduction cells. In particular, stack 201 includes a stack of N normal cells 204 followed by a reduction cell 206 followed by a stack of N normal cells 208 followed by a reduction cell 210 followed by a stack of N normal cells 212. All normal cells have the same architecture, as are reduction cells. The architecture of the normal cells is independent of that of the reduction cells. Normal cells and reduction cells are described in more detail in B. Zoph, V. Vasudevan, J. Shlens, and Q. V. Le., "Learning transferable architectures for scalable image recognition." In CVPR, 2018, available at https://arxiv.org/pdf/1707.07012.pdf.

Generally, each cell in the stack 201 is configured to receive as input one or more outputs of one or more preceding cells and to process the input to generate an output for the input. For example, each cell is configured to receive a direct input from a previous cell (that immediately precedes the current cell) and a skip input from the cell before the previous cell. As shown in the example of FIG. 2B, each cell has two input activation tensors and one output. The first cell in the stack 201 receives two copies of the network input 202 as input. Each cell following the first cell receives as input the outputs of the preceding two cells.

In some implementations, to reduce computational costs associated with processing an input image, every application of the reduction cell can be followed by a convolution operation of stride 2 that reduces the image size of the output of the reduction cell. Normal cells can preserve the image size.

The neural network 200 includes a sub-network 214 following the stack of cells 201. The sub-network 214 is configured to receive as input the output of the stack of cells 201 and to process the output of the stack 201 to generate the network output 216. As an example, the sub-network 214 includes a soft-max classification neural network layer.

Figure 3:
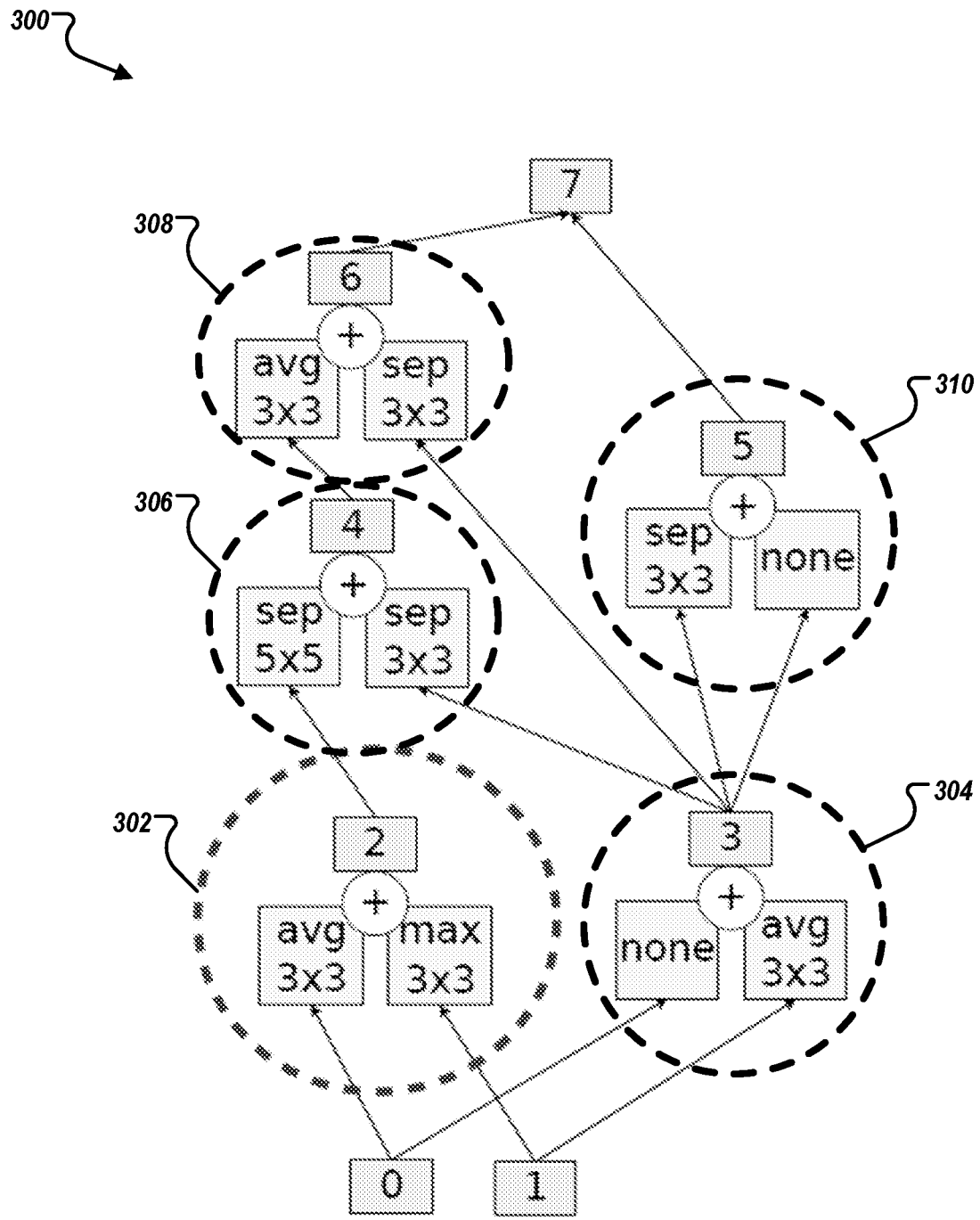
FIG. 3 shows an example architecture of a cell.

FIG. 3 shows an example architecture of a cell 300.

The cell 300 includes a plurality of operation blocks: blocks 302, 304, 306, 308, and 310. The cell 300 receives two input tensors that are considered hidden states "0" and "1." More hidden states of the cell 300 are then constructed through pairwise combinations. For example, the pairwise combination applies a first operation to an first hidden state, applies a second operation to a second hidden state, and combines (by adding or concatenating) the outputs of the first and second operations to generate a new hidden state. The first, and second operations are selected from a predetermined set of possible operations including, for example, convolutions, pooling layers.

As shown in FIG. 3, the first pairwise combination of block 302 applies a 3×3 average pooling operation to hidden state 0 and a 3×3 max pooling operation to hidden state 1, in order to produce hidden state 2. The next pairwise combination can choose from hidden states 0, 1, and 2 to produce hidden state 3 (in this example, the pairwise combination of block 304 chooses hidden states 0 and 1 as input), and so on. After five pairwise combinations corresponding to five blocks, any hidden states that remain unused (e.g., hidden states 5 and 6 in FIG. 3) are concatenated to form the output of the cell 300 (hidden state 7).

Another example of a reduction cell is described as follows. The reduction cell includes five pairwise combinations. The first pairwise combination is configured to apply a first 3×3 max pooling operation to a first reduction hidden state, apply a second 3×3 max pooling operation to the first reduction hidden state, and combine outputs of the first 3×3 max pooling operation and the second 3×3 max pooling operation to generate a first pairwise combination output. The second pairwise combination is configured to apply a first 7×7 separable convolution operation to the first pairwise combination output, apply a first 3×3 separable convolution operation to the first reduction hidden state, and combine outputs of the first 7×7 separation convolution operation and the first 3×3 separable convolution operation to generate a second pairwise combination output. The third pairwise combination is configured to apply a third 3×3 max pooling operation on a second reduction hidden state, apply a second 3×3 separable convolution operation on the second reduction hidden state, and combine outputs of the third 3×3 max pooling operation and the second 3×3 separable convolution operation on the second reduction hidden state to generate a third pairwise combination output. The fourth pairwise combination is configured to apply a fourth 3×3 max pooling operation on the second reduction hidden state, apply a second 7×7 separable convolution operation on the first reduction hidden state, and combine outputs of the fourth 3×3 max pooling operation and the second 7×7 separable convolution operation to generate a fourth pairwise combination output. The fifth pairwise combination is configured to apply a first 5×5 separable convolution operation on the fourth pairwise combination output, apply a second 5×5 separable convolution operation on the fourth pairwise combination output, and combine outputs of the first 5×5 separable convolution operation and the second 5×5 separable convolution operation to generate a fifth pairwise combination output. The reduction cell is configured to combine the second pairwise combination output, the third pairwise combination output, and the fifth pairwise combination output to generate a new reduction hidden state.

FIGS. 4A and 4B illustrate examples of a mutation.

In particular, FIG. 4A illustrates a hidden state mutation, which includes making a random choice of whether to modify the normal cell or the reduction cell of a given candidate architecture. Once a cell is chosen, the hidden state mutation selects one of the five pairwise combinations uniformly at random. The hidden state mutation then selects one of the two operations 402 and 404 of the selected pairwise combination uniformly at random, and replaces a hidden state associated with the selected operation with another hidden state from within the cell. As shown in FIG. 4A, the selected operation 404 has one hidden state 3. The mutation replaces this hidden state with hidden state 4 from within the cell. To keep the feed-forward property of the convolutional neural network architecture of the cell, the hidden state associated with the selected operation can be replaced subject to a constraint that no loops are formed.

FIG. 4B illustrates an operation mutation that operates similar to the hidden state mutation as far as selecting one of the two cells, one of the five pairwise combinations, and one of the two operations of the selected pairwise combination. Instead of modifying the hidden state associated with the selected operation, the operation mutation modifies the selected operation itself. In particular, the operation mutation replaces the selected operation with an operation that is randomly selected from a predetermined set of operations. For example, the predetermined set of operations may include, but not be limited to, 3×3 depthwise-separable convolution, 5×5 depthwise-separable convolution, 7×7 depthwise-separable convolution, 1×7 followed by 7×1 convolution, identity, 3×3 average pooling, 3×3 max pooling, and 3×3 dilated convolution.

As shown in FIG. 4B, operation 406 is replaced with a none operation 408 (e.g., an identity operation that allows an input of the identity operation to pass through without changing the input, i.e., the output of the identity operation is the same as the input).

Figure 5:
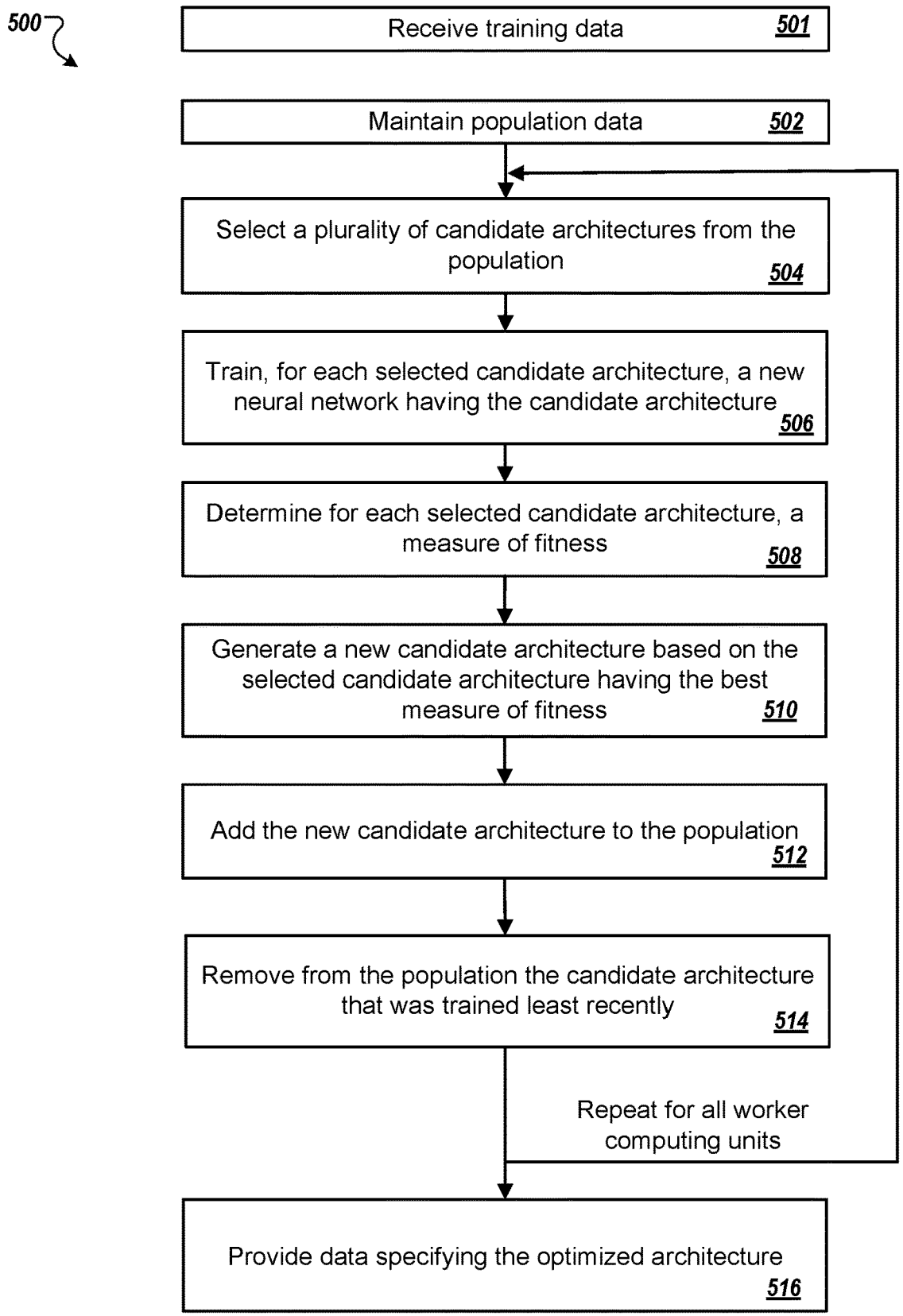
FIG. 5 is a flow diagram of an example process for determining an optimized neural network architecture for performing a machine learning task.

FIG. 5 is a flow diagram of an example process for determining an optimized neural network architecture for performing a machine learning task. For convenience, the process 500 will be described as being performed by a system of one or more computers located in one or more locations. For example, a neural network architecture optimization system, e.g., the neural network architecture optimization system 100 of FIG. 1, appropriately programmed in accordance with this specification, can perform the process 500.

The system receives training data for training a neural network to perform a machine learning task (step 501). The training data includes a plurality of training examples and a respective target output for each of the training examples. The system divides the received training data into a training subset, a validation subset, and, optionally, a test subset.

The system maintains population data in a population repository (step 502). The system can initialize the population repository with one or more default neural network architectures. The population data includes, for each candidate architecture in a population of candidate architectures, (i) data defining the candidate architecture, and (ii) data specifying how recently a neural network having the candidate architecture has been trained while determining the optimized neural network architecture.

The system repeatedly performs the following steps 504-514 using each of a plurality of worker computing units until termination criteria for the training have been satisfied. Each worker operates asynchronously from each other worker.

The system selects, by the worker computing unit, a plurality of candidate architectures from the population (step 504).

The system trains, for each selected candidate architecture and by the worker computing unit, a new neural network having the candidate architecture on a training subset of the training data to determine trained values of parameters of the new neural network (step 506). The worker can train the new neural network starting from the parameter values that are associated with the candidate architecture in the population data.

The system determines, for each selected candidate architecture and by the worker computing unit, a measure of fitness by evaluating a performance of the trained new neural network on a validation subset of the training data (step 508). The measure of fitness can be any measure that is appropriate for the machine learning task and that measures the performance of the neural network on the machine learning task. For example, measures of fitness can include various classification errors, intersection-over-union measures, reward or return metrics, and so on.

The system generates, by the worker computing unit, a new candidate architecture based on the selected candidate architecture having the best measure of fitness (step 510). In particular, the worker modifies the architecture for at least one of the cells in the candidate architecture having the best measure of fitness.

In some implementations, the worker mutates the selected candidate architecture by processing data specifying the selected candidate architecture through a mutation neural network. The mutation neural network is a neural network that has been trained to receive an input that includes data specifying an architecture and to generate an output that defines another architecture that is different than the input architecture.

In some other implementations, the worker maintains data identifying a set of possible mutations that can be applied to an input architecture. For instance, the worker can randomly select a mutation from a set of mutations, and apply the randomly selected mutation to the selected candidate architecture.

The set of possible mutations can include any of a variety of architecture modifications that represent the addition, removal, or modification of a component from an architecture or a change in a hyper-parameter for the training of the neural network having the architecture.

The system adds the new candidate architecture to the population (step 512).

The system removes from the population the candidate architecture that was trained least recently (step 514). By removing the least recently trained architecture (or the oldest architecture) at each iteration under aging evolution, the system allows all candidate architectures in the population to have a short lifespan. Therefore, the population is wholly renewed frequently, leading to more diversity and more exploration, which results in better neural network architecture search results while retaining the system's efficiency (thanks to the simplicity of aging evolution).

The system provides data specifying the optimized architecture (step 516). In particular, the system selects the best fit candidate neural network architecture as the optimized neural network architecture to be used to carry out the machine learning task. That is, once the workers are done performing iterations and termination criteria have been satisfied, e.g., after more than a threshold number of iterations have been performed or after the best fit candidate neural network in the population repository has a fitness that exceeds a threshold, the system selects the best fit candidate neural network architecture as the final neural network architecture be used in carrying out the machine learning task.

In some implementations, the system obtains the trained values for the parameters of a trained neural network having the optimized neural network architecture from the population repository. In some other implementations, the system trains a neural network having the optimized architecture, e.g., either from scratch or to fine-tune the parameter values generated as a result of determining the optimized architecture for the neural network. The system can further train the neural network having the optimized neural network architecture on more training data to determine the final trained values of the trained neural network.

The system then uses the trained neural network to process requests received by users, e.g., through the API provided by the system. In other implementations, the system can provide the data specifying the optimized architecture and, optionally, the trained parameter values, in response to receiving the training data, e.g., to a user over a data communication network.

In implementations where the system generates a test subset from the training data, the system also tests the performance of a trained neural network having the optimized neural network architecture on the test subset to determine a measure of fitness of the trained neural network on the user-specified machine learning task. The system can then provide the measure of fitness for presentation to the user that submitted the training data or store the measure of fitness in association with the trained values of the parameters of the trained neural network.

As only the candidate architecture having the best measure of fitness at each iteration is selected to be mutated, the above method allows the population of candidate architectures to improve over time, resulting in an optimized neural network having better performance (e.g., better accuracy) when performing the particular machine learning task compared to existing neural network architecture search methods.

Further, using the described method, the system can automatically generate a resultant trained neural network that is able to achieve performance on a machine learning task competitive with or exceeding state-of-the-art hand-designed models while requiring little or no input from a neural network designer.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A neural network system for accurately performing an image processing task by using a task neural network having an optimized neural network architecture that comprises a sequence of normal cells and reduction cells, the neural network system comprising one or more computers and one or more non-transitory computer storage media encoded with instructions that, when executed by the one or more computers, cause the one or more computers to implement:
the task neural network having the optimized neural network architecture that comprises the sequence of normal cells and reduction cells, wherein each normal cell and each reduction cell is a fully convolutional neural network,
wherein the sequence of normal cells and reduction cells comprises a first stack of normal cells followed by a first reduction cell followed by a second stack of normal cells followed by a second reduction cell followed by a third stack of normal cells, and
wherein each normal cell in the sequence comprises a plurality of pairwise combinations, wherein each of the plurality of pairwise combinations is configured to apply a first operation to a first normal hidden state, apply a second operation to a second normal hidden state, and combine outputs of the first operation and the second operation to generate a new normal hidden state, and
wherein each reduction cell in the sequence comprises a plurality of pairwise combinations, comprising:
a first pairwise combination configured to apply a first 3×3 max pooling operation to a first reduction hidden state, apply a second 3×3 max pooling operation to the first reduction hidden state, and combine outputs of the first 3×3 max pooling operation and the second 3×3 max pooling operation to generate a first pairwise combination output, wherein the first pairwise combination output is provided to a next pairwise combination in the plurality of pairwise combinations for further processing,
wherein the task neural network is configured to receive at least one image as input and to process the at least one image through the sequence of normal cells and reduction cells to generate an output to perform the image processing task.

2. The neural network system of claim 1, wherein the first operation and the second operation are selected from a predetermined set of operations comprising a convolution and a pooling operation.

3. The neural network system of claim 1, wherein each of the first stack of normal cells, the second stack of normal cells, and the third stack of normal cells comprises a same number of normal cells.

4. The neural network system of claim 3, wherein each of the normal cells and reduction cells in the sequence is configured to receive a direct input from a previous cell and a skip input from a cell preceding the previous cell.

5. The neural network system of claim 1, wherein each of the normal cells and reduction cells in the sequence is configured to receive as input one or more outputs of one or more preceding cells and to process the input to generate a cell output.

6. The neural network system of claim 1, wherein each normal cell in the sequence comprises five pairwise combinations.

7. The neural network system of claim 1, wherein each reduction cell in the sequence comprises five pairwise combinations.

8. The neural network system of claim 1, wherein the task neural network is generated by performing operations comprising:
receiving training data for training a neural network to perform the machine learning image processing task, the training data comprising a plurality of training examples and a respective target output for each of the training examples; and
determining, using the training data, the optimized neural network architecture for performing the image processing task, comprising:
maintaining population data comprising, for each candidate architecture in a population of candidate architectures, (i) data defining the candidate architecture, and (ii) data specifying how recently a neural network having the candidate architecture has been trained while determining the optimized neural network architecture, and
repeatedly performing the following using each of a plurality of worker computing units each operating asynchronously from each other worker computing unit:
selecting, by the worker computing unit, a plurality of candidate architectures from the population,
training, for each selected candidate architecture and by the worker computing unit, a new neural network having the candidate architecture on a training subset of the training data to determine trained values of parameters of the new neural network;
determining, for each selected candidate architecture and by the worker computing unit, a measure of fitness by evaluating a performance of the trained new neural network on a validation subset of the training data,
generating, by the worker computing unit, a new candidate architecture based on the selected candidate architecture having the best measure of fitness, wherein generating the new candidate architecture comprises:
randomly selecting a mutation from a set of mutations, the set of mutations comprising an operation mutation that randomly selects one of a plurality of cells of the selected candidate architecture and replaces at least one of the operations previously performed within the selected cell in the selected candidate architecture with another operation that is randomly selected from a predetermined set of operations, and
applying the randomly selected mutation to the selected candidate architecture, and
adding the new candidate architecture to the population.

9. The neural network system of claim 8, wherein the operations further comprise:
selecting the candidate architecture in the population having the best fitness as the optimized neural network architecture for the task neural network.

10. The neural network system of claim 8, wherein the operations further comprise:

determining the trained values of parameters of a neural network having the optimized neural network architecture.

11. The neural network system of claim 10, wherein determining the trained values of parameters of the neural network having the optimized neural network architecture comprises:
selecting, as the trained values of the parameters of the neural network having the optimized neural network architecture, the trained values of the parameters that are associated with the architecture that is associated with the best measure of fitness.

12. The neural network system of claim 10, wherein determining the trained values of parameters of the neural network having the optimized neural network architecture comprises:
further training the neural network having the optimized neural network architecture on more training data to determine the trained values of the parameters.

13. The neural network system of claim 8, wherein the operations further comprise:
training the new candidate architecture to determine the trained values of parameters; and
associating the trained values of the parameters with the new candidate architecture in the population data.

14. The neural network system of claim 8, wherein training, for each selected candidate architecture and by the worker computing unit, a new neural network having the candidate architecture on a training subset of the training data to determine trained values of parameters of the new neural network comprises: training the new neural network starting from the trained values of the parameters that are associated with the candidate architecture in the population data.

15. The neural network system of claim 8, wherein the operations further comprise:
initializing the population with a plurality of default candidate architectures.

16. The neural network system of claim 8, wherein, for each candidate architecture, the data defining the candidate architecture identifies an architecture for one or more cells that are each repeated multiple times to generate the candidate architecture.

17. The neural network system of claim 8, wherein the machine learning task is at least one of image processing or image classification.

18. The neural network system of claim 1, wherein the plurality of pairwise combinations further comprise:
a second pairwise combination configured to apply a first 7×7 separable convolution operation to the first pairwise combination output, apply a first 3×3 separable convolution operation to the first reduction hidden state, and combine outputs of the first 7×7 separation convolution operation and the first 3×3 separable convolution operation to generate a second pairwise combination output.

19. The neural network system of claim 18, wherein the plurality of pairwise combinations further comprise:
a third pairwise combination configured to apply a third 3×3 max pooling operation on a second reduction hidden state, apply a second 3×3 separable convolution operation on the second reduction hidden state, and combine outputs of the third 3×3 max pooling operation and the second 3×3 separable convolution operation on the second reduction hidden state to generate a third pairwise combination output.

20. The neural network system of claim 19, wherein the plurality of pairwise combinations further comprise:
a fourth pairwise combination configured to apply a fourth 3×3 max pooling operation on the second reduction hidden state, apply a second 7×7 separable convolution operation on the first reduction hidden state, and combine outputs of the fourth 3×3 max pooling operation and the second 7×7 separable convolution operation to generate a fourth pairwise combination output.

21. The neural network system of claim 19, wherein the plurality of pairwise combinations further comprise:
a fifth pairwise combination configured to apply a first 5×5 separable convolution operation on the fourth pairwise combination output, apply a second 5×5 separable convolution operation on the fourth pairwise combination output, and combine outputs of the first 5×5 separable convolution operation and the second 5×5 separable convolution operation to generate a fifth pairwise combination output,
wherein the reduction cell is configured to combine the second pairwise combination output, the third pairwise combination output, and the fifth pairwise combination output to generate a new reduction hidden state.

22. The neural network system of claim 1, wherein the image processing task is an image classification task.

* * * * *